United States Patent [19]

Wilman

[11] Patent Number: 5,325,181
[45] Date of Patent: Jun. 28, 1994

[54] NULLING OPTICAL BRIDGE FOR MEASUREMENT OF CHANGES IN REFLECTIVITY AND/OR TRANSMISSIVITY

[75] Inventor: John G. Wilman, Hopewell Junction, N.Y.

[73] Assignee: International Business Machines Corporation, Armonk, N.Y.

[21] Appl. No.: 965,124

[22] Filed: Oct. 22, 1992

[51] Int. Cl.$^5$ .......................................... G01N 21/55
[52] U.S. Cl. .................................................. 356/448
[58] Field of Search ................ 356/433, 435, 448, 321

[56] References Cited

U.S. PATENT DOCUMENTS

| | | | |
|---|---|---|---|
| 3,703,337 | 11/1972 | Neugroschel | 356/178 |
| 3,743,430 | 7/1973 | Riggs | 356/432 |
| 4,211,488 | 7/1980 | Kleinknecht | 356/369 |
| 4,350,441 | 9/1982 | Wicnieski | 356/40 |
| 4,908,508 | 3/1990 | Dubbeldam | 250/225 |
| 4,933,567 | 6/1990 | Silva | 250/572 |
| 5,022,765 | 6/1991 | Guidotti | 356/435 |
| 5,108,185 | 4/1992 | Mansuripur | 356/369 |

OTHER PUBLICATIONS

"An Optical Bridge Reflectometer for Sensitive Measurements of Ion Implantation Dose" by D. Guidotti, PACS: 06.70 Dn 42.80-f.

"Novel and Nonintrusive Optical Thermometer" by Daniel Guidotti, IBM Thomas J. Watson Research Center, Appl. Phys. Lett. 60(5), Feb. 3, 1992.

*Primary Examiner*—Richard A. Rosenberg
*Attorney, Agent, or Firm*—Richard Lau

[57] ABSTRACT

A hulling optical bridge includes light means for supplying light and splitter means for splitting the light into a first light beam and a second light beam. The first light beam is directed to a surface having a parameter to be measured, and a first photodetector receives light reflected from or transmitted through the surface and generates a first signal indicative of the magnitude of the reflected or transmitted light. A second photodetector receives the second light beam and generates a second signal indicative of the magnitude of the second light beam. An electronic balancing circuit operates in a first mode when the parameter is maintained at a constant level, for adjusting the first and second signals to equal magnitudes, and operates in a second mode when the parameter varies, for applying a compensating signal to the first signal to balance the first and second signals. Further, a monitor is provided which is responsive to the magnitude of the compensating signal for indicating the magnitude of the parameter.

20 Claims, 3 Drawing Sheets

NULLING OPTICAL BRIDGE FOR MEASUREMENT OF CHANGES IN REFLECTIVITY AND/OR TRANSMISSIVITY

FIELD OF THE INVENTION

The present invention relates generally to measurement of changes in reflectivity and/or transmissivity of a surface under test and, more particularly, to the use of such changes for measuring a parameter of a surface and, even more particularly, to a hulling optical bridge for such purpose.

BACKGROUND OF THE INVENTION

Measuring the temperature of a semiconductor device during various stages of processing is necessary for characterizing and controlling processing of the device. A preferred method of conducting such temperature measurements is by contactless temperature monitoring.

Commonly assigned U.S. Pat. No. 5,022,765, entitled "NULLING OPTICAL BRIDGE FOR CONTACTLESS MEASUREMENT OF CHANGES IN REFLECTIVITY AND/OR TRANSMISSIVITY", issued to Guidotti et al , incorporated herein by reference, discloses an apparatus for conducting contactless temperature monitoring by implementing a hulling optical bridge for measuring the difference in relative power of more than one light beam. As shown in FIG. 1, labelled as "Prior Art", an optical beam source 1 is linearly polarized by a polarizer 2 such that the electric field direction of the emerging beam makes an angle ($\Phi$) with respect to an optic axis of a polarization sensitive beamsplitter prism 3. The prism 3 splits the incident light into two orthogonally polarized beams, beam A and beam B. The power of the beams A,B depends on the angle $\Phi$, and the divergence angle ($\Theta$) of the beams A,B depends on the design properties of the prism 3. As $\Phi$ is varied by rotating polarizer 2, the difference in power between the two beams (A−B) is varied while the total power emerging from the prism 3 remains constant. The polarizer/prism combination is therefore used as a continuously variable beamsplitter. Beam A is directed from the prism 3 to a reflector 4, and the reflected beam A' is then directed to a photodetector 5. The other beam B is directed to the sample to be measured and the reflected beam B' is reflected from the sample surface at near-normal incidence and directed to a photodetector 6. The photo-current from photodetectors 5 or 6 is proportional to the power in beams A' or B', respectively The photo-current from detectors 5 and 6 is fed to a balance circuit 7, where a difference signal (A'−B') is amplified by amplifier 8 and measured.

Power fluctuations in the light source are eliminated by the null-point measurement of the difference signal (A'−B') which converts a measurement of change in reflectivity or transmissivity into a measurement of the angle $\Phi$. This is accomplished by rotating the polarizer 2 by an angle so as to maintain the null condition (A'−B') at all times. The null condition renders the device measurement independent of source power fluctuations because whatever the source variation, variations in A and B are identical in magnitude, and occur in synchronism and therefore are always subtracted. The null condition is automatically, continuously maintained during a measurement by a feedback loop 9 which governs the rotation of the polarizer 2 as dictated by the sign and magnitude of the error signal (A'−B').

Thus, if a change in sample temperature causes a change in sample reflectivity, then the reflected power in beam A' will vary, and the difference (A'−B') will deviate from null. The polarizer angle $\Phi$ is then rotated by an amount necessary to restore null. The amount of rotation is proportional to the change in sample temperature for small angular variations. Unfortunately, the use of such a nulling optical bridge apparatus has been found to be somewhat impractical in many applications. Since the polarizer 2 must be mechanically rotated, a motor and associated mechanical linkage is required to accomplish such rotation. These components have been found to be overly large and cumbersome, and highly expensive, causing difficulty in incorporating the apparatus in a manufacturing environment. Although the components can be downsized to a certain extent, downsized components reduce the accuracy in accomplishing the required small incremental rotations of the polarizer 2. For instance, it has been found that the polarizer 2 must be rotated approximately 1/1000 of a degree to reflect a change of one degree celsius in a sample. Further, mechanically rotating the polarizer 2 for balancing has the limitation of not being capable of adequately compensating for unpolished or slightly polished wafers. In this regard, the degree by which the polarizer 2 must rotate for compensating for the low reflectivity of such wafers is too extreme for the mechanical components to properly achieve. Thus, the reflectivity and/or transmissivity of unpolished or slightly polished wafers cannot be properly measured using this mechanical apparatus.

Thus, there remains a need for a cost-effective nulling optical bridge which eliminates the problems associated with physical rotation of a polarizer for nulling, and which is easily adaptable for use in a manufacturing environment.

SUMMARY OF THE INVENTION

It is therefore an object of the present invention to develop a device for contactless measurement of changes in reflectivity and/or transmissivity of a surface under test.

It is another object of the present invention to utilize measurement of reflectivity and/or transmissivity of a surface to measure a parameter, such as temperature, of the surface.

It is yet another object of the present invention to develop a device for such contactless measurement which is relatively inexpensive to construct and which can be easily miniaturized for use in a manufacturing environment, while maintaining accuracy in the measurement.

It is still another object of the present invention to develop a device which is capable of accurately measuring reflectivity and/or transmissivlty of unpolished or slightly polished wafers.

In order to accomplish the above and other objects of the present invention, a nulling optical bridge includes light means for supplying light and splitter means for splitting the light into a first light beam and a second light beam. The first light beam is directed to a surface having a parameter to be measured. A first photodetector receives light reflected from or transmitted through the surface and generates a first signal indicative of the magnitude of the reflected or transmitted light, and a second photodetector receives the second light beam and generates a second signal indicative of the magnitude of the second light beam. An electronic balancing circuit operates in a first mode when the parameter is maintained at a constant level, for adjusting the first and second signals to equal magnitudes, and operates in a second mode when the parameter varies for applying a compensating signal to the first signal to balance the first and second signal. Further, the optical bridge includes means responsive to the magnitude of the compensating signal for indicating the magnitude of the parameter.

BRIEF DESCRIPTION OF THE DRAWINGS

These and other objects, features, aspects and advantages will be more readily apparent and better understood from the following detailed description of the invention, in which.

DETAILED DESCRIPTION OF THE PREFERRED EMBODIMENT

Figure 1:
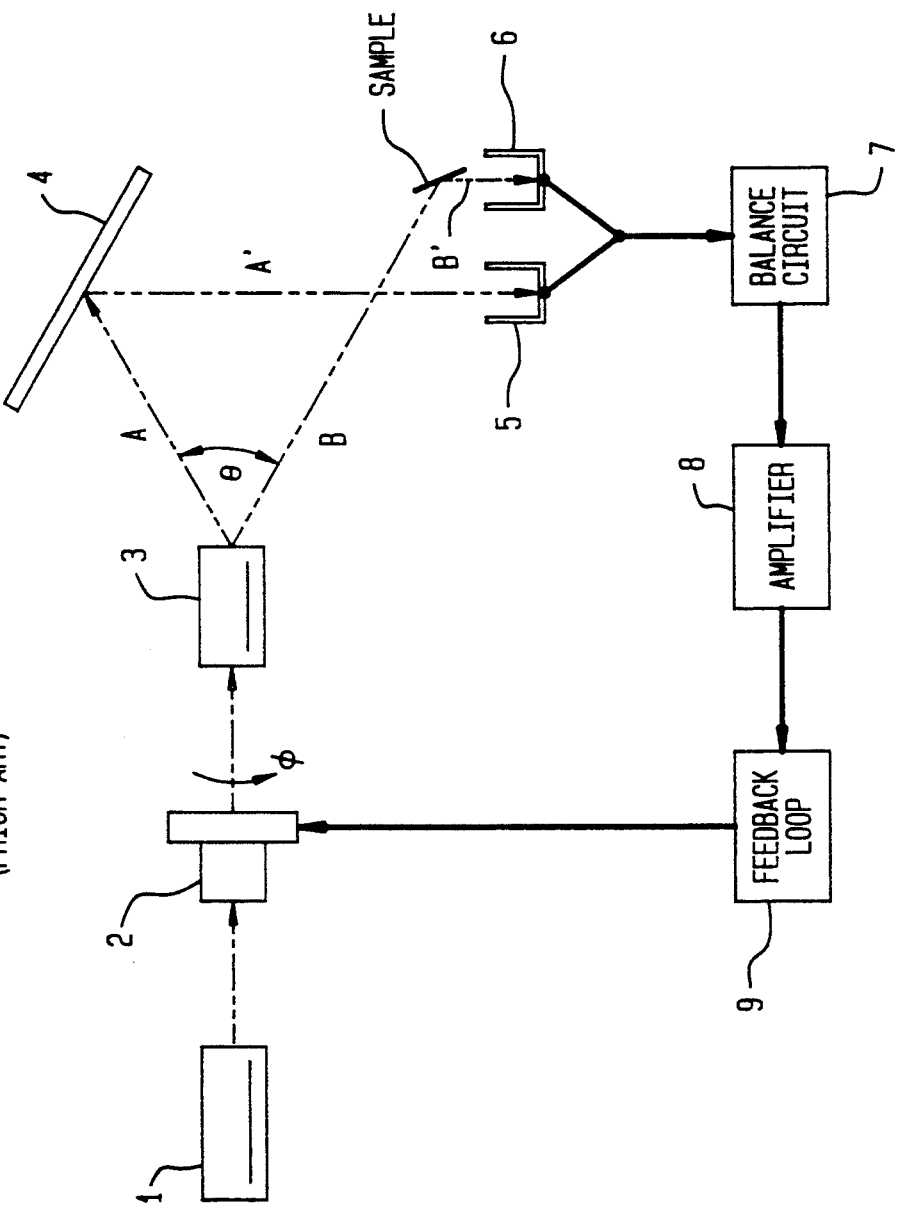
FIG. 1 is a schematic arrangement of a prior art nulling optical bridge for the measurement of temperature or ion implantation dose.
Figure 2:
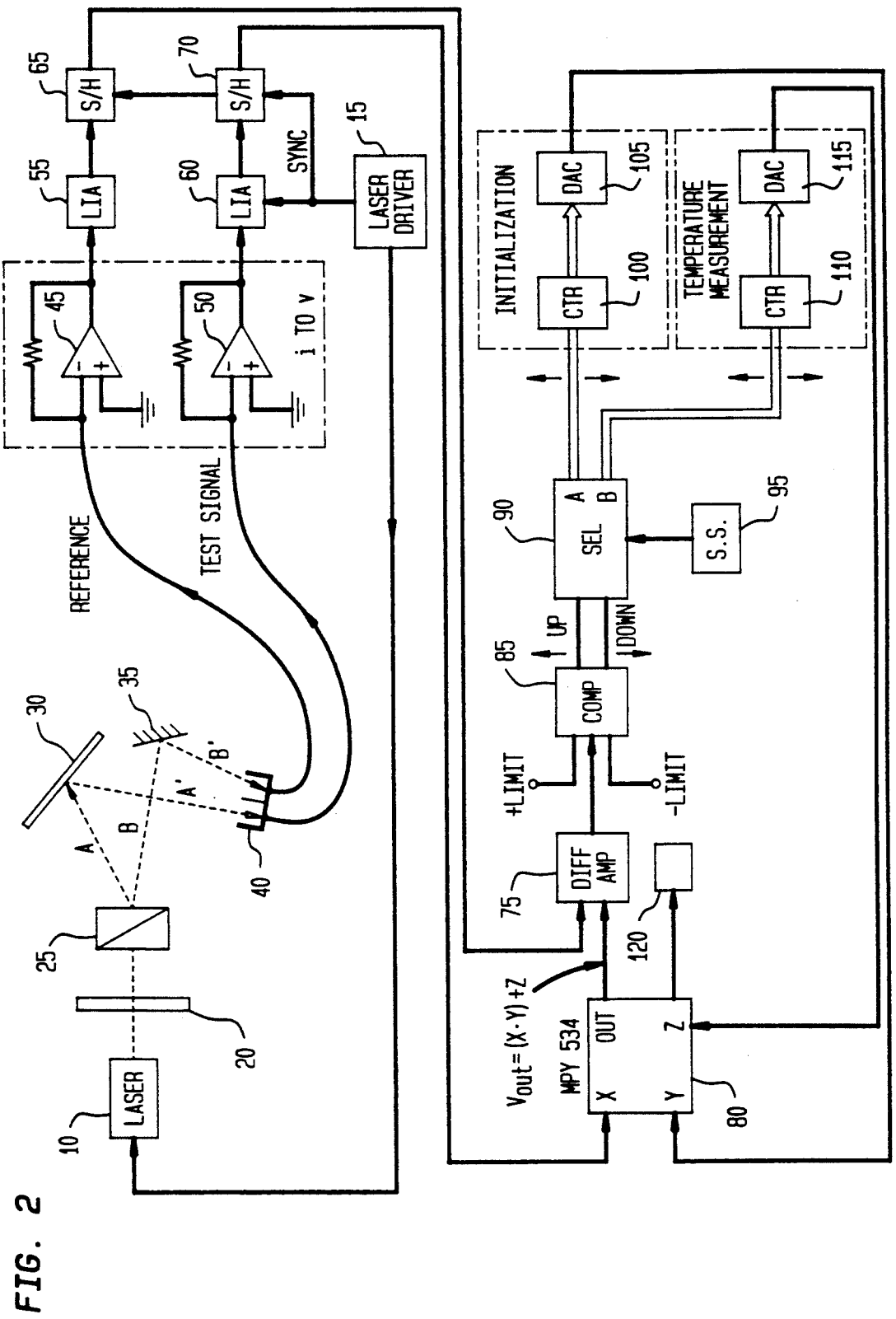
FIG. 2 is block diagram of a hulling optical bridge in accordance with the present invention.

The operation of a nulling optical bridge circuit will now be described with reference to the FIGS. Referring initially to FIG. 2, the on/off operation of a source of light, such as a laser 10, is controlled by a driver 15. The laser 10 outputs a light beam and, if required, this light beam is linearly polarized by a polarizer 20. Polarization of the light beam output from the laser 10 may not be necessary if the light beam is sufficiently polarized and adequately stable. In this regard, increased levels of polarization and stabilization of the light beam is required in order to achieve greater accuracy in temperature measurement.

A beam splitter 25 splits the polarized light beam into two components or, more specifically, into two orthogonally polarized beams, A and B (the ordinary and extra-ordinary rays). The beam splitter 25 is preferably a 15-20 degree Wollaston-type beam splitter. However, those skilled in the art will appreciate that other types of beam splitters can also be used in the practice of the present invention.

Either of the beams, A or B, for instance, beam A, is reflected off a surface under test, such as a wafer 30, having a parameter to be measured, such as a temperature, while the other beam, beam B, is reflected off a reference mirror 35. A photodetector 40 receives the reflected beams, A' and B', and responsively develops a test signal and a reference signal. More specifically, in response to beam B', the photodetector 40 develops a reference signal which is indicative of the magnitude of beam B', i.e., the reference signal is representative of the magnitude of the light beam B' reflected from the reference mirror 35; and, in response to beam A', the photodetector 40 develops a test signal which is indicative of the magnitude of beam A', i e the test signal is representative of the magnitude of the light beam A' reflected from the wafer 30.

The photodetector 40 may comprise two separate photodetectors, corresponding to beams A' and B' or, preferably, the photodetector 40 may comprise one photodetector 40 having two cells, generally referred to as a bi-cell photodetector. Each cell of the bi-cell photodetector is capable of detecting one of the light beams A' and B'. Advantageously, since bi-cell photodetectors are simultaneously fabricated on a common substrate and using the same materials, the characteristics of each cell of the bi-cell photodetector are essentially identical. This provides for increased accuracy in performing temperature measurements since beam detection will be under the same conditions in the reference channel and test channel.

The reference. signal and test signal are output from the photodetectors 40 in the form of current signals. Input amplifiers, 45 and 50, convert the reference signal and test signal, respectively, from current signals to voltage signals. Each voltage signal is then sent to a respective lock-in-amplifier, 55 and 60.

Illustratively, each lock-in-amplifier, 55 and 60, comprises a synchronous demodulator and a low pass filter (not shown). The lock-in-amplifiers, 55 and 60, are synchronized with the driver 15. Such synchronization allows the lock-in-amplifiers, 55 and 60, to detect only the part of its respective voltage signal that is synchronized with the driver 15.

Figure 3A:
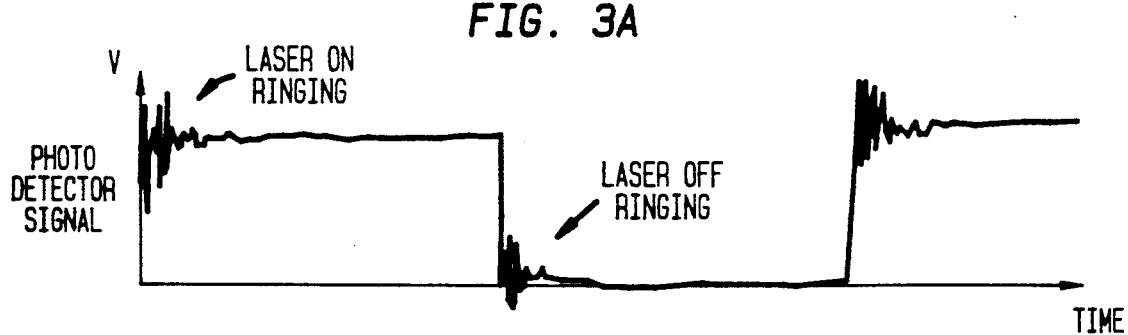
FIGS. 3A-C are plots of synchronized output signals developed by a photodetector and a sample-and-hold module in accordance with the present invention.
Figure 3B:
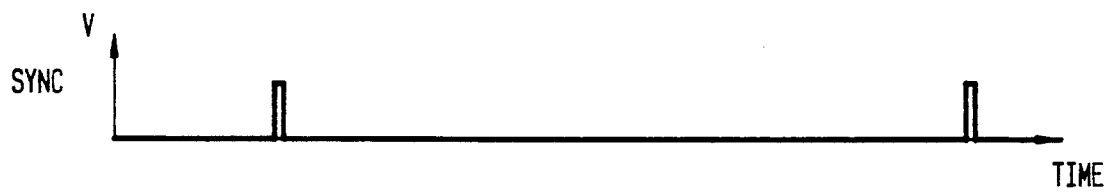
Figure 3C:
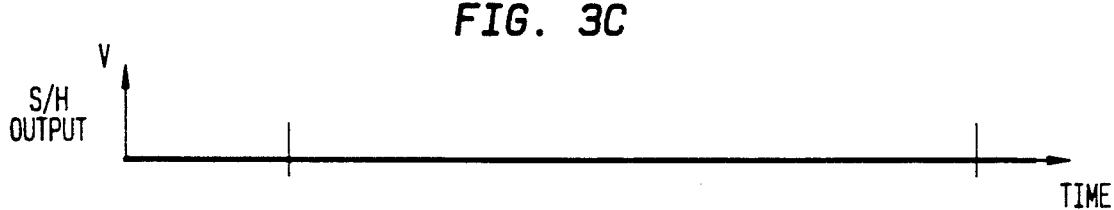

Subsequent to detection by the lock-in-amplifiers, 55 and 60, the detected voltage signals are sent to sample-and-hold modules, 65 and 70. Each of the sample-and-hold modules, 1.65 and 70, are also synchronized with the driver 15. This allows the sample-and-hold modules 65,70 to only sample the detected voltage signals when the laser 10 is stable. More specifically, reference is now made to FIG. 3A, which is representative of either the reference signal or the test signal developed by the photodetector 40. The output signal developed by the photodetector 40 responsively corresponds to the on and off cycling of the laser 10. It can be seen that each time the laser 10 turns on or off, the laser 10 is momentarily in an unstable transition state. The unstableness being commonly referred to as noise or ringing. As the laser 10 stabilizes, this ringing dissipates and ceases. The ringing and stabilization of the laser 10 is reflected in the output signal developed by the photodetector 40. Thus, as illustrated in FIGS. 3B-C, synchronization of the sample-and-hold modules 65,70 with the driver 15 allows the sample-and-hold modules 65,70 to sample the detected voltage signals and develop an output signal only during the stable periods of the on cycle of the laser 10.

Referring again to FIG. 2, the output signal developed by the sample-and-hold module 65 of the reference channel is sent to a differential amplifier 75, and the output signal developed by the sample-and-hold module 70 of the test channel is sent directly to a multiplier 80. The multiplier 80 can be any conventional, off-the-shelf multiplier, such as an MPY534, manufactured by Burr-Brown Corp., in Tucson, AZ. The output signal, referred to as variable X, received by the multiplier 80 from the test channel sample-and-hold module 70, is multiplied by a factor Y, and the resulting product has a factor Z added thereto so as to develop the multiplier 80 output signal, $V_{out}$, as follows:

$$V_{out}=(X\times Y)+Z$$

As explained in detail hereinafter, the circuit of the present invention operates in two modes, namely, an initialization mode and a temperature measurement mode. During the initialization mode, the factor Y is variable, and the factor Z is fixed for setting a value for the factor Y for use during the temperature measurement mode; and during the temperature measurement mode, the factor Y is fixed in accordance with the value set therefor during the initialization mode, and the factor Z is variable for use in measuring the temperature change of the wafer 30.

The output signal, $V_{out}$, of the multiplier 80 is then sent to the differential amplifier 75. The differential amplifier 75 compares the output signal, $V_{out}$, developed by the multiplier 80 with the output signal developed by the sample-and-hold module 65 of the reference channel. The differential amplifier 75 responsively develops an output signal having a magnitude which is proportional to the algebraic difference, if any, between the two signals thus compared. The output signal of the differential amplifier 75 is then sent to a comparator 85. Of course, if the two compared signals are equal in magnitude, then the output signal developed by the differential amplifier 75 indicates that the compared signals are equal or balanced.

The comparator 85 compares the output signal of the differential amplifier 75 with a preset reference voltage, and develops an output signal indicating the amount of compensation required for balancing the output signal, $V_{out}$, of the multiplier 80 and the output signal developed by the sample-and-hold module 65 of the reference channel. More specifically, if the output signal, $V_{out}$, of the multiplier 80 is out of balance, i.e., of greater or lesser magnitude, with the output signal developed by the sample-and-hold module 65 of the reference channel, the differential amplifier 75 will develop and output a signal indicating such unbalanced condition to the comparator 85. The comparator 85 will then compare the differential amplifier 75 output signal with a preset reference voltage, and responsively develop an output signal indicating the amount of compensation required for balancing the two signals.

Preferably, in order to allow for electrical or mechanical noise that may cause disturbances or fluctuations in temperature measurements, a deadband having an upper limit and a lower limit may be established in the comparator 85. If the differential amplifier 75 output signal falls within this deadband range, the output signal developed by the comparator 85 will indicate no requirement of compensation for balancing. Thus, the sensitivity of temperature measurements can be adjusted as desired by modifying the upper and lower limits of the deadband. In other words, as the difference between the upper and lower limits of the deadband increases, the sensitivity of the temperature measurements decreases, and vice versa. Upper and lower deadband limits can be set in the comparator 85 by incorporating a conventional resistor bridge arrangement.

The comparator 85 output signal is sent to a selector 90.. The selector 90 has single-shot circuitry 95 electrically connected thereto, which causes the selector 90 to deliver output pulses in response to the signal received from the comparator 85. The pulses output from the selector 90 are delivered to either counter 100 or counter 110, and the pulses are delivered in accordance with the same clock as that of these counters 100,110. The purpose of the counters 100,110 is explained hereinbelow.

Prior to a temperature measurement, the circuit operates in the initialization mode to determine or adjust the value of the factor Y required to balance the circuit to reflect the starting temperature of the wafer 30. During the initialization mode, the value of the factor Z is preset in the counter 110 and sent to the multiplier 80 via the digital-to-analog converter (DAC) 115. Although the factor Z can be preset to any value, since temperature measurements are typically taken from the factor Z, as further explained hereinbelow, it is generally preferable that the factor Z be preset during initialization to wafer 30 temperature, which may be either room temperature or the temperature of the tool in which the wafer 30 is located. This would allow wafer 30 temperature to directly correlate with the factor Z.

Figure 4A:
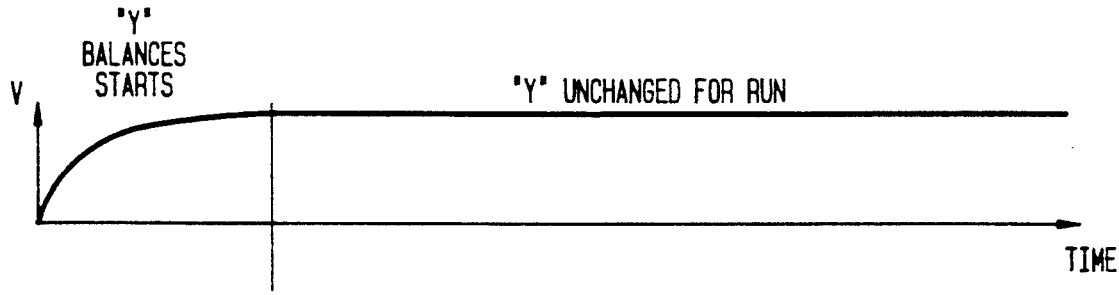
FIGS. 4A-B are plots of variables during operation of the hulling optical bridge of the present invention.
Figure 4B:
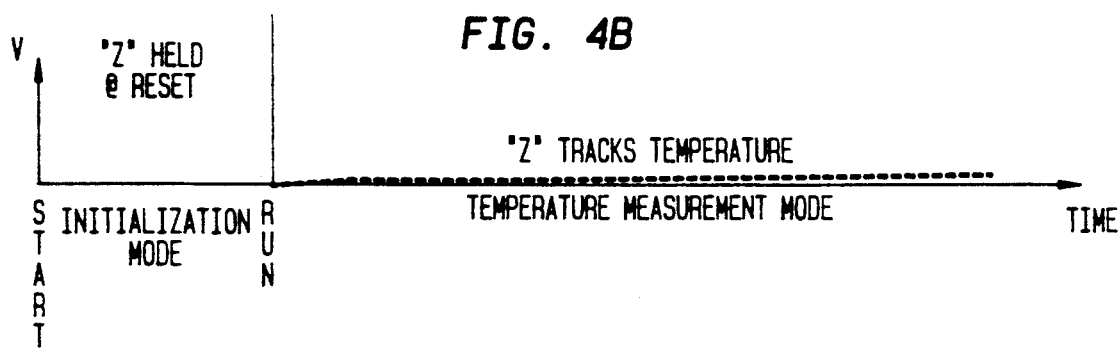

During the initialization mode, the selector 90 delivers its output pulses to counter 100 via selector channel A, and the count value stored in the counter 100 is either incrementally increased or decreased as dictated by the selector 90 output pulses. The count value from the counter 100 is then sent to the multiplier 80 via DAC 105 for use as the factor Y. As such, the factor Y corresponds to the count value of the counter 100, and any changes made to the count value of the counter 100 is reflected in the factor Y. Thus, as shown in FIG. 4, with the factor Z remaining constant or fixed during the initialization mode, the magnitude of the factor Y is varied or adjusted until the circuit is balanced or nulled to reflect the starting temperature of the wafer 30. Once the circuit is balanced or nulled, initialization is complete. The circuit then switches to the temperature measurement mode and monitors the temperature of the wafer 10. No changes in variables occur until the temperature of the wafer 30 deviates from its starting temperature.

Note that once the circuit is in the null condition, temperature measurement is independent of any laser 10 power fluctuation. In this regard, regardless of what laser 10 power variations that may occur, variations in the beams A,B will be identical in magnitude, and will occur in synchronism and therefore are always subtracted by the circuit.

If a change in wafer 30 temperature occurs or, more specifically, if a change in wafer 30 temperature causes the reflectivity of the wafer 30 to vary so that the magnitude of the output signal developed by the differential amplifier 75 becomes either greater than the upper deadband limit or less than the lower deadband limit established in the comparator 85, then the circuit in the temperature measurement mode will track or detect such a change. When this occurs, the selector 90 delivers its output pulses to counter 110 via selector channel B, and the count value stored in the counter 110 is either incrementally increased or decreased as dictated by the selector 90 output pulses. The count value from the counter 110 is then sent to the multiplier 80 via DAC 115 for use as the factor Z and, as such, the factor Z is altered in accordance with the count value of the counter 110. Thus, with the factor Y remaining constant or fixed during the temperature measurement mode, the magnitude of the factor Z is varied until the circuit is balanced or nulled to reflect the altered temperature of the wafer 30.

The change in factor Z is the amount of compensation required to balance the signals, and is reflective of the change in temperature of the wafer 30. More particularly, the change in magnitude of the factor Z required for balancing the signals can be converted to temperature variation for determining the change in temperature of the wafer 30. Since the starting temperature of the wafer 30 is known, the altered temperature of the wafer 30 is obtainable by adding to or subtracting from the starting temperature according to the change in factor Z. Thus, as noted hereinabove, it can be seen that if the factor Z is preset during initialization to wafer 30 temperature, the factor Z would directly correlate to wafer 30 temperature, and any changes in wafer 30 temperature would be directly reflected by the factor Z. Accordingly, the wafer 30 temperature can then be taken from the factor Z by the temperature monitor 120.

Although the present invention has been described in terms of reflectivity for measuring temperature of a wafer, those skilled in the art will realize that the invention is also capable of measuring transmissivity, and can be used for any surface to determine any surface parameter which is a function of reflectivity and/or transmissivity. For example, other surfaces include metal anneals and thin films, and other parameters that can be measured include ion implantation doses.

While the invention has been described in terms of specific embodiments, it is evident in view of the foregoing description that numerous alternatives, modifications and variations will be apparent to those skilled in the art. Thus, the invention is intended to encompass all such alternatives, modifications and variations which fall within the scope and spirit of the invention and the appended claims.

What is claimed is:

1. A nulling optical bridge, comprising:
   light means for supplying light;
   splitter means for splitting said light into a first light beam and a second light beam, said first light beam being directed to a surface having a parameter to be measured;
   a first photodetector for receiving light reflected from said surface and generating a first signal indicative of the magnitude of the reflected light;
   a second photodetector for receiving said second light beam and generating a second signal indicative of the magnitude of said second light beam; and
   an electronic balancing circuit operating in a first mode when said parameter is maintained at a constant level, for adjusting said first and second signals to equal magnitudes, and operating in a second mode when said parameter varies, for applying a compensating signal to said first signal to balance said first and second signals, said electronic balancing circuit comprising:
   a multiplier for developing an output signal by multiplying said first signal with an adjusting signal, and adding the resulting product with the compensating signal, wherein when said electronic balancing circuit is operating in said first mode, said compensating signal remains constant and said adjusting signal is modified for adjusting said first and second signals to equal magnitudes, and wherein when said electronic balancing circuit is operating in said second mode, said adjusting signal remains constant and said compensating signal is modified for balancing said first and second signals; and
   means for comparing the output signal of said multiplier with said second signal for determining the appropriate magnitude of either of said adjusting signal or said compensating signal, and delivering the signal to said multiplier.

2. A nulling optical bridge according to claim 1, further comprising means responsive to the magnitude of said compensating signal for indicating the magnitude of said parameter.

3. A nulling optical bridge according to claim 1, further comprising a polarizer for linearly polarizing light from said light means.

4. A hulling optical bridge according to claim 1, wherein said light means comprises a laser.

5. A hulling optical bridge according to claim 1, wherein said parameter to be measured is temperature.

6. A nulling optical bridge according to claim 1, wherein said parameter to be measured is ion implantation dose.

7. A nulling optical bridge according to claim 1, wherein said first and second photodetectors are cells of a bi-cell photodetector.

8. A nulling optical bridge according to claim 1, further comprising a reference mirror which directs said second light beam to said second photodetector.

9. A hulling optical bridge according to claim 1, wherein said electronic balancing circuit includes means for establishing a deadband range so that when the variation of said parameter is within the deadband range, neither adjusting of said first and second signals nor applying of a compensating signal to said first signal is effectuated.

10. A nulling optical bridge according to claim 9, wherein said means for establishing a deadband range comprises a comparator.

11. A nulling optical bridge, comprising:
    light means for supplying light;
    splitter means for splitting said light into a first light beam and a second light beam, said first light beam being directed to a surface having a parameter to be measured;
    a first photodetector for receiving light transmitted through said surface and generating a first signal indicative of the magnitude of the transmitted light;
    a second photodetector for receiving said second light beam and generating a second signal indicative of the magnitude of said second light beam; and
    an electronic balancing circuit operating in a first mode when said parameter is maintained at a constant level, for adjusting said first and second signals to equal magnitudes, and operating in a second mode when said parameter varies, for applying a compensating signal to said first signal to balance said first and second signals, said electronic balancing circuit comprising:
    a multiplier for developing an output signal by multiplying said first signal with an adjusting signal, and adding the resulting product with the compensating signal, wherein when said electronic balancing circuit is operating in said first mode, said compensating signal remains constant and said adjusting signal is modified for adjusting said first and second signals to equal magnitudes, and wherein when said electronic balancing circuit is operating in said second mode, said adjusting signal remains constant and said compensating signal is modified for balancing said first and second signals; and
    means for comparing the output signal of said multiplier with said second signal for determining the appropriate magnitude of either said adjusting signal or said compensating signal, and delivering the signal to said multiplier.

12. A nulling optical bridge according to claim 11, further comprising means responsive to the magnitude of said compensating signal for indicating the magnitude of said parameter.

13. A nulling optical bridge according to claim 11, further comprising a polarizer for linearly polarizing light from said light means.

14. A nulling optical bridge according to claim 11, wherein said light means comprises a laser.

15. A nulling optical bridge according to claim 11, wherein said parameter to be measured is temperature.

16. A nulling optical bridge according to claim 11, wherein said parameter to be measured is ion implantation dose.

17. A nulling optical bridge according to claim 11, wherein said first and second photodetectors are cells of a hi-cell photodetector.

18. A nulling optical bridge according to claim 11, further comprising a reference mirror which directs said second light beam to said second photodetector.

19. A nulling optical bridge according to claim 11, wherein said electronic balancing circuit includes means for establishing a deadband range so that when the variation of said parameter is within the deadband range, neither adjusting of said first and second signals nor applying of a compensating signal to said first signal is effectuated.

20. A nulling optical bridge according to claim 19, wherein said means for establishing a deadband range comprises a comparator.

* * * * *